W. C. BRUSON.
Improvement in Sifters or Pulverizers.
No. 132,896.                        Patented Nov. 12, 1872.
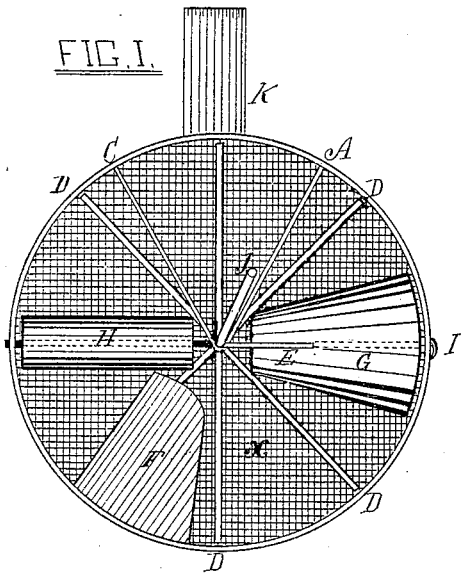
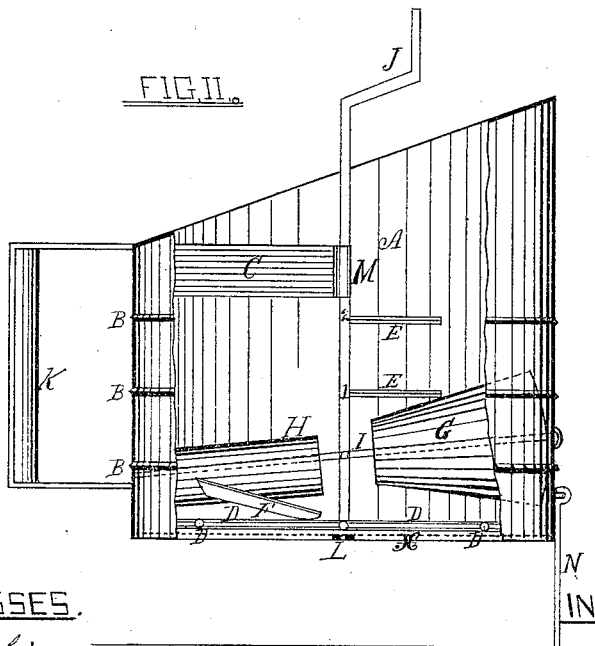
WITNESSES.                        INVENTOR.
G. L. Chapin
E. J. Chapin        Scale of one inch        Willard C. Bruson

UNITED STATES PATENT OFFICE.

WILLARD C. BRUSON, OF CHICAGO, ILLINOIS.

IMPROVEMENT IN SIFTERS OR PULVERIZERS.

Specification forming part of Letters Patent No. 132,896, dated November 12, 1872.

*To all whom it may concern:*

Be it known that I, WILLARD C. BRUSON, of Chicago, in the county of Cook and State of Illinois, have invented an Improved Sifter, Pulverizer, and Strainer, of which the following is a specification:

The present invention relates to an improvement in that class of sifters, pulverizers, strainers, &c., which are for convenience made in the form of scoops, to be operated by hand for pulverizing, sifting, or straining flour, meal, salt, sugar, drugs, medicines, and for other purposes for which they may be adapted.

In the drawing, Figure 1 is a top or plan view of my improved sifter; Fig. 2, an elevation of the same with a part of the scoop broken away to show the construction of the parts.

A represents a cylindrical scoop, which is made of metal or other suitable material. One side is wider than the other for the convenience of filling the scoop from a barrel or bin, as the case may be. The bottom X of the sifter in this case is made of wire sieve-cloth soldered on the internal periphery of the scoop; but perforated metal plate may be used when straining is to be done. The scoop A is provided with a handle, K, for the convenience of operation, and with a hinged leg, N, by means of which, when said leg is turned down, as at Fig. 2, the weight of the scoop and contents receive a considerable support therefrom, relieving the hand of the operator, and thereby aiding the operation very materially. The lower agitator consists of several radial arms, D—in this case eight—which are rigidly fastened to a vertical crank-shaft, J, which is provided with a step, L, at the under side of the wire sieve X, to rotate in and with a brace, C M, projecting inwardly from the scoop to form an upper support for said shaft, by which means the radial arms D are held so as to swing in a plane parallel to the sieve X. The middle part of the crank-shaft J is provided with agitators E E, which serve both the purpose of stirring the contents of the scoop and indicating the amount of substance in the scoop, any number of arms being used of any desirable size or length to indicate ounces, pints, quarts, &c. The periphery of the scoop is provided with grooves B B B, to indicate also the amount of contents in the scoop, to strengthen and to ornament the same; but they are not claimed to be new. A little above the sieve X, and in an inclined position, is placed a pulverizer, F, which is fastened to the internal periphery of the scoop, for the purpose of mashing any lumps in the substance to be treated; and, as will be seen, the pulverizing in this case is done between the agitators and plate F, and not against the sieve. This plate is sufficient for sifting flour, meal, &c.; but for salt, sugar, and other lumpy or fibrous substances I use the rollers H G, which rotate on a rod, I, which is removable, and may be drawn out so as to remove the said rollers when they are not required for use; and, as will be seen, the conical roller G is hung by the inclined rod I higher than roller H. This is done to divide the work of crushing between said rollers, and, as will be seen, the pulvering in this case is done above the sieve, and not against it.

The material employed in the manufacture is sheet metal and wire, except the agitators D, which may be cast-iron.

The operation is simple, requiring only that the operator should, after the scoop is filled, hold the handle with one hand and rotate the crank-shaft J by the other, allowing the scoop to rest on the hinged leg. The rollers H G need not be used only when hard substances are to be pulverized or strained.

I am aware that sifters have been constructed with radial arms for pulverizing any lumpy masses coming between said arms and the sieve, and that similar radial arms have had rollers placed upon them to effect the pulverizing of lumps coming between said rollers and the sieve. In my device any lumps in the mass are pulverized between the radial arms rotating with the shaft J and the rollers H G revolving upon the stationary rod I.

Having thus described my invention, what I claim to be new is as follows:

1. The rotating radial arms D, combined with the stationary pulverizing-plate F located above the plane of said arms and the scoop A, as set forth.

2. In combination with the scoop A and sieve X, the crank-shaft J provided with the agitators E, which are so located as to denote the quantity of material contained in the scoop.

3. The combination of the rollers H G revolving upon a stationary rod, I, with the radial agitators D for pulverizing hard substances, substantially as described.

WILLARD C. BRUSON.

Witnesses:
E. J. CHAPIN,
G. L. CHAPIN.